Nov. 6, 1956
H. A. SHABAKER
2,769,694
SOLIDS WITHDRAWAL UNIT
Filed Oct. 1, 1951
3 Sheets-Sheet 1
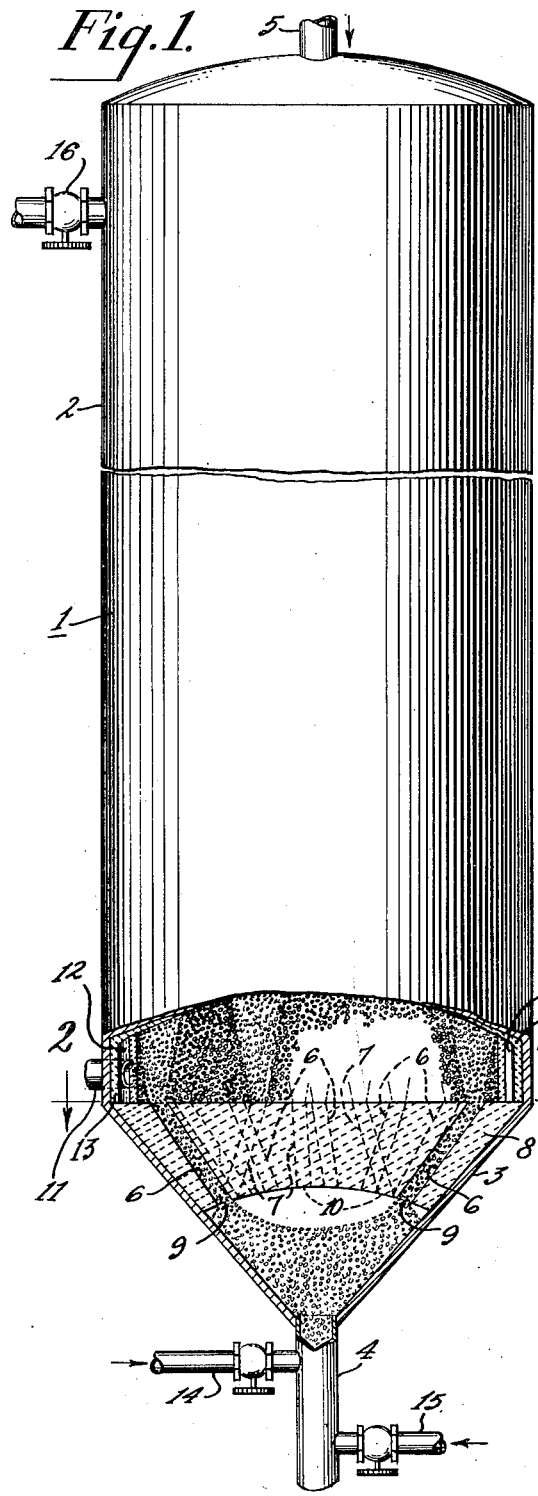
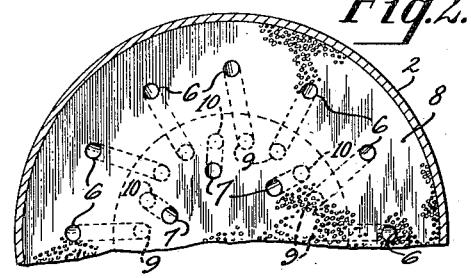
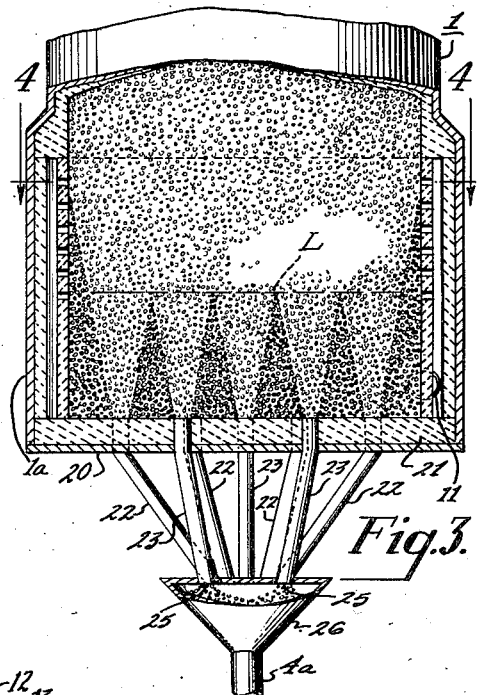
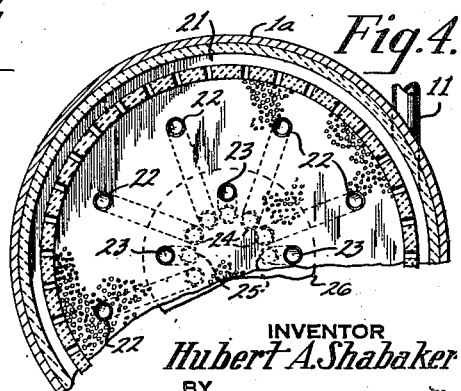
INVENTOR
*Hubert A. Shabaker*
BY
ATTORNEY

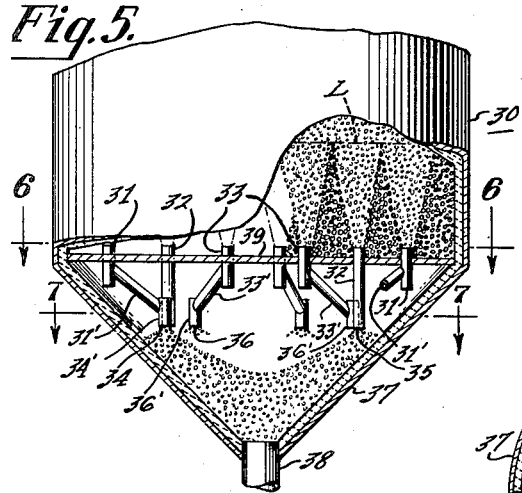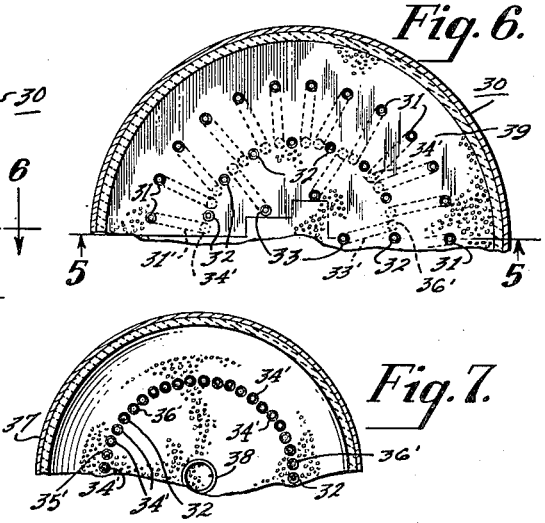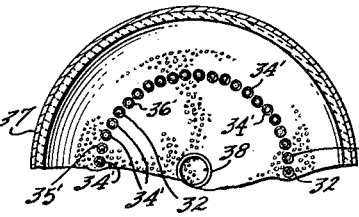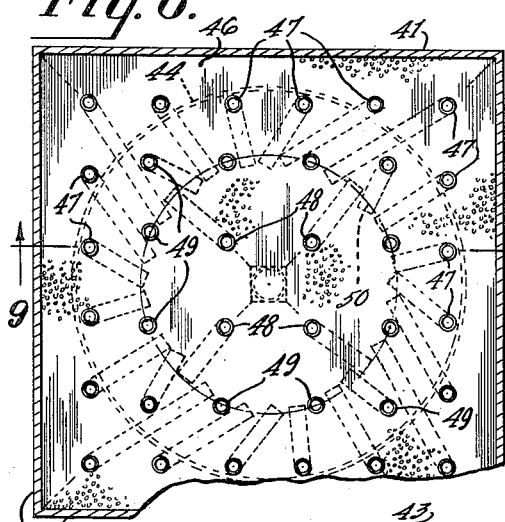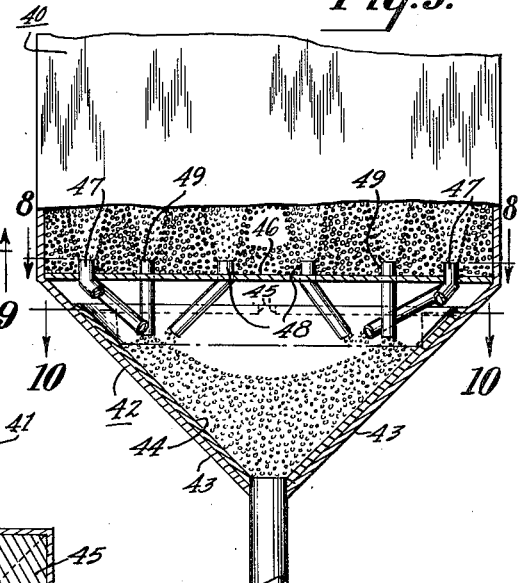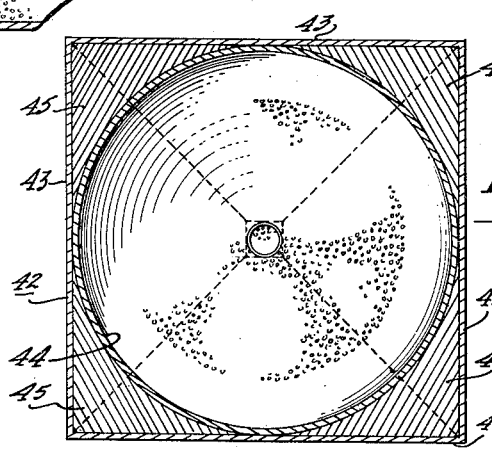

Nov. 6, 1956 H. A. SHABAKER 2,769,694
SOLIDS WITHDRAWAL UNIT
Filed Oct. 1, 1951 3 Sheets-Sheet 3
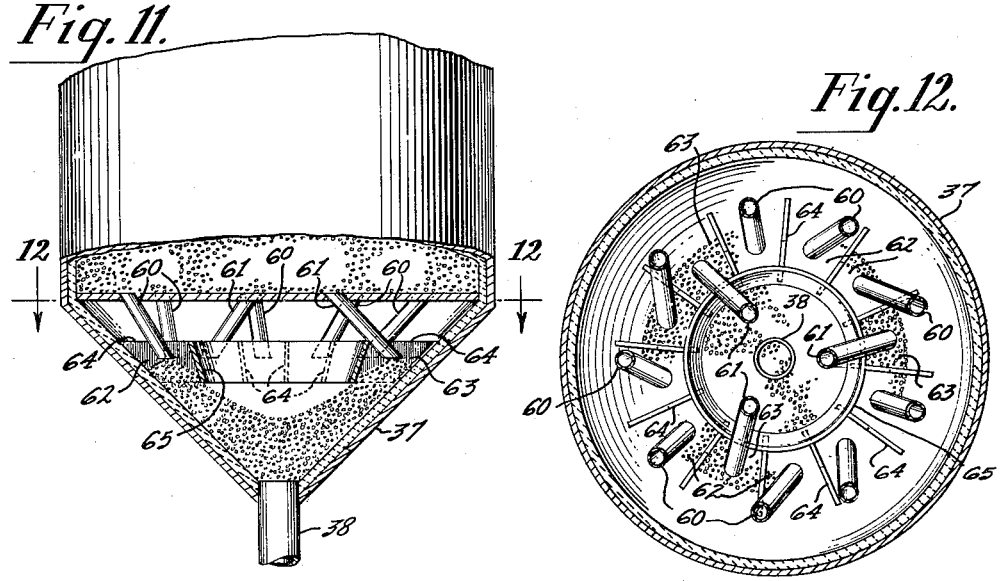
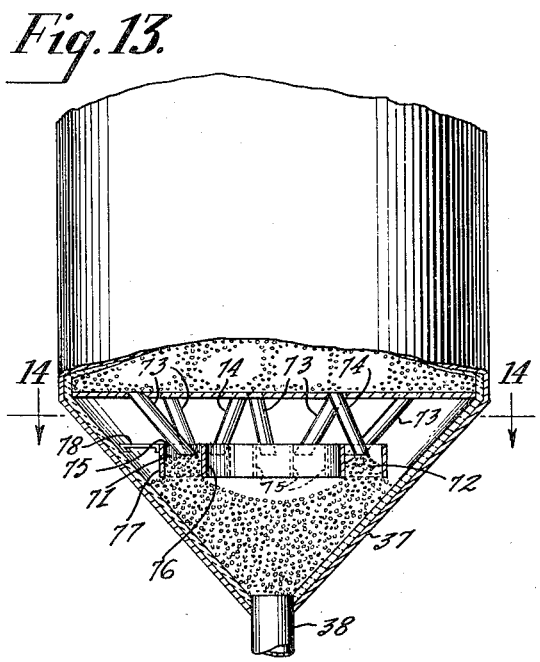
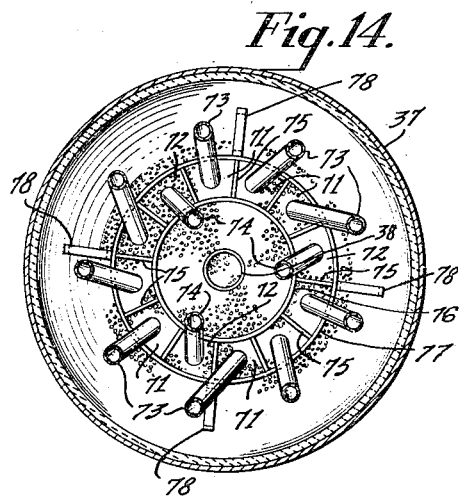
INVENTOR
Hubert A. Shabaker
BY
ATTORNEY

United States Patent Office 2,769,694
Patented Nov. 6, 1956

2,769,694

SOLIDS WITHDRAWAL UNIT

Hubert A. Shabaker, Media, Pa., assignor to Houdry Process Corporation, Wilmington, Del., a corporation of Delaware Application October 1, 1951, Serial No. 249,187

1 Claim. (Cl. 23—284)

The present invention relates to withdrawing solid granular materials from a treating vessel and is particularly concerned with a novel arrangement designed to secure substantial uniformity of solids flow over the transverse area of a compact bed of solids in such vessel, the solids being discharged therefrom into a withdrawal pipe of significantly less diameter than that of the vessel.

Numerous systems are known wherein a compact body of granular solids gravitates through a reaction vessel or treating vessel wherein such solids are contacted with fluids for the purpose of chemically or physically acting upon the solids, or for the purpose of modifying the fluids— physically or chemically—by contact with the granular solids. Typical systems include those employed for catalytic cracking or other catalytic conversion of hydrocarbons wherein solid granular catalyst is continuously circulated and gravitates as a compact bed through the catalytic reactor and/or the kiln or regenerator utilized for combustion of carbonaceous deposit in the catalyst, as well as non-catalytic systems, for instance those of the so-called "pebble-heater" type wherein a solid granular contact mass is utilized for heating (or cooling) of fluids by direct heat exchange. This is a continuation-in-part application and discloses some common subject matter (including a system for treating granular solids with chemically reactive gas) with Reissue Patent 23,942 of February 8, 1955, which resulted from application Serial No. 349,333 filed April 16, 1953, replacing 2,596,610 of May 13, 1952, issuing from Serial No. 15,336 filed March 17, 1948, which was a continuation-in-part of both the now abandoned application Serial No. 6,683 filed February 6, 1948, and Serial No. 6,722 filed February 6, 1948, which issued as 2,596,609 on May 13, 1952.

When granular material is discharged from the base of a vessel through an outlet of relatively small size as compared with the size of the vessel, and whether the vessel is of circular, rectangular or other transverse configuration, the velocity of flow will vary widely across the horizontal cross-section of the vessel, the velocity being greatest directly above the outlet. While this difference in velocity decreases at higher levels in the vessel, in the absence of special arrangements, equal velocity and even flow are not obtained in vessels having a cross-sectional area much greater than that of the outlet. Conventionally vessels designed to continuously discharge granular solids are provided with an inverted frusto-conical or funnel-shaped bottom, but such configuration alone does not secure uniformity of downward flow over the cross-sectional area of the vessel.

In my copending applications referred to above, there is disclosed a novel arrangement for obtaining substantially uniform withdrawal of solids over the lateral area of the bed in a treating vessel wherein the solids enter the funnel-shaped bottom of the vessel through a series of distributing channels or conduits having inlets thereto arranged in several concentric series; the channels being directed downwardly at appropriate angles so that the outlets of the channels form a single circular pattern. If more than two such concentric arrangements of the inlets to the channels are utilized, as would likely be the case in vessels of large diameter, the outlets of the channels are nevertheless arranged in a common single circle, and in such arrangements, the number of channels in each series is made less as it is located further inward from the wall.

In accordance with the present invention, the apparatus, comprising the circumferentially arranged outlets of the conduits, is provided with baffle means, positioned beneath and spaced from the circumferentially arranged outlets of the conduits, and these baffle means laterally confine the solids discharging from said conduits into separate expanded relatively-shallow compact moving masses at a point intermediate between the outlets to said conduits and the confining member therebeneath. These baffle means can be considered as open bottomed chambers having partitions into which the solids are discharged from the downcoming conduits.

In the accompanying drawings apparatus related to the invention is illustrated as applied to vessels in general, several typical embodiments being shown. In these drawings:

Figure 1 is a front elevation of a treating vessel similar to that illustrated in my copending application, parts being broken away and appearing in section;

Figure 2 is a partial horizontal cross-section taken along the line 2—2 of Figure 1;

Figure 3 is a fragmentary front elevation showing the lower portion of a modified embodiment.

Figure 4 is a partial horizontal cross-section taken along line 4—4 of Figure 3;

Figure 5 is a fragmentary front elevation, partly in longitudinal cross-section, of the lower part of the vessel in accordance with a further modified embodiment;

Figures 6 and 7 are partial horizontal cross-sections taken along line 6—6 and 7—7 of Figure 5 respectively; the line 5—5 in Figure 6 denotes the section portrayed in Figure 5;

Figure 8 is a horizontal cross-section of the lower portion of the vessel illustrating a further embodiment as applied to a vessel of rectangular cross-section;

Figure 9 is a front elevation of the embodiment shown in Figure 8, being partly in longitudinal section taken along the line 9—9 of Figure 8;

Figure 10 is a cross-section taken along the line 10—10 of Figure 9.

Figures 11 and 13 are views similar to Figure 5 but showing modifications, defined and claimed herein and Figures 12 and 14 are horizontal cross-sections taken along lines 12—12 and 14—14 of Figures 11 and 13, respectively.

Referring now more particularly to Figure 1 there is shown a treating vessel particularly adapted for effecting reaction at elevated temperatures between a mineral material or a component thereof with a chemically reactive gas; an adaptation of such a vessel, although not limited thereto, is in the treatment of an iron-containing material such as clay or bauxite with a sulfiding gas such as hydrogen sulfide or carbon disulfide. The reactor vessel proper, indicated generally at 1, is bounded by a substantially vertical cylindrical wall 2 through the major portion of its length, and at its lower part comprises a section of shorter length and reduced diameter shown as an inverted conical section 3 terminating in a discharge outlet 4. The solid material is introduced through a charging conduit 5, provided with known suitable means such as a seal gas, valve or the like (not shown) to prevent or retard escape of treating gas from the reactor through this conduit.

The solid materials thus introduced are distributed in known manner over the cross-section of the vessel to form a substantially uniform gravitating bed of the solid material, which gravitates through the apparatus, entering the section 3 through two series of distributing channels 6 and 7, formed in the separating block of ceramic material 8. The channels are arranged in a suitable pattern to obtain substantially uniform withdrawal of the solids material from the vessel 1 and to redistribute the same over a narrower cross-sectional area in section 3 for ultimate discharge through outlet 4.

The particular arrangement of the distributing conduits or channels in this embodiment will be understood from Figure 2 taken in connection with Figure 1. It will be seen that the outer series of channels 6 are directed downwardly and inwardly and the inner series of channels 7 are directed downwardly and outwardly, so that the outlets 9 of channels 6 and the outlets 10 of channels 7 are arranged in a single circular pattern. By such arrangement and with each of the channels 6 and 7 receiving granules from an approximately equal area of supply thereto the tendency to differences in velocity of movement between granules adjacent the wall and those closer to the center is largely avoided, and substantial uniformity of withdrawal of such granules from the bed thereabove is achieved.

Instead of only two concentric series formed by the channels at their inlets, three or more of such concentric series may be employed, if desired, particularly in reactors of large diameter. In such arrangement the number of channels in each series will be reduced respectively as the particular series is located further inward from the wall.

In the particular form illustrated in Figures 1 and 2, means are provided for the introduction of heating or treating gas into vessel 1 for upward passage through the bed of granular material therein, in the form of a gas inlet 11 communicating with an annular slot 12 formed in an insulating inner wall 13 of the vessel. The inner wall 13 is provided with openings such as slots or perforations (similar to that shown in the embodiment of Figure 3) whereby the gas from slot 12 enters radially into the vessel to contact the bed of materials therein. A gas inlet line 14 is in communication with conduit 4 and provides treating gas for passage upwardly through the bed of granular material contained in the frusto-conical portion 3 of the vessel, such gas thereafter passing upwardly through channels 6 and 7 into the descending mass of solid material contained within the cylindrical portion of vessel 1. To induce upward flow to the gas introduced through line 14, a seal gas is introduced into outlet pipe 4 through line 15 at a slightly higher pressure than that in line 14 so that a portion of the gas from line 15 passes upwardly to prevent downward flow of gas introduced through line 14. In the upper section of the reaction vessel 1 the ascending gases are intermixed with the gas entering the vessel by means of openings in slot 12 from the conduit 11, and the admixed gases continue to flow upwardly through the vessel counter to the descending solids therein and are discharged from the upper portion of the vessel through a line 16 after being disengaged from the solids in known manner.

In the particular embodiment illustrated in Figures 1 and 2 the insulating inner wall 13 as well as the block 8 are advantageously formed of ceramic or other refractory or heat resistant materials, which materials also are preferably resistant to corrosion by hot reactive gases which would attack metal. The use of the corrosion resistant block at the inner wall is particularly important in connection with the suggested use of the described treater for sulfidation of clays and like minerals. By the arrangement shown, furthermore, the hot gas in the circular slot 12 serves to maintain the solid materials at their attained temperature without significant heat loss through the wall 2.

In addition to the suggested use of the reactor thus far described in the treatment of granular materials with chemically reactive gas, other uses of the particular embodiment will be readily apparent. For instance the described apparatus is of particular advantage in a catalytic hydrocarbon conversion system wherein the hydrocarbon conversion reactions are carried out at temperatures below that required in the subsequent regeneration step for burning of the coke formed. Thus, in catalytic polymerization of low molecular weight hydrocarbons, the coked catalyst may enter the regenerating kiln at temperatures of about 600° F. or below. Inert gas such as a flue gas or gas of low oxygen content is directly admitted to the cylindrical portion of vessel 1 through line 11 and will heat the catalyst to combustion temperatures of the coke. A gas rich in oxygen is admitted to the frusto-conical lower portion of the vessel through line 14 and is only partly consumed in burning of residual coke on the hot catalyst entering that zone from above, the resulting effluent gas containing unconsumed oxygen passing upwardly through channels 6 and 7, into the cylindrical portion of the vessel wherein it becomes admixed with and is diluted by the inert or oxygen-free gas directly introduced into such upper section through line 11, to form a diluted regenerating gas. By operating in this manner, the catalyst of highest coke content is treated with diluted regenerating gas of low oxygen content, and the final regeneration by burning of the remaining small amount of residual coke on the catalyst is assured by the short contact with oxygen-rich gas in the lower zone. This permits very effective utilization of the quantity of oxygen employed. If desired, the rate of flow of the concentrated treating gas and seal gas in the lower zone may be such, as to at least in part, effect cooling of the catalyst to required temperature for the on-stream hydrocarbon conversion reaction.

The modified embodiment shown in Figures 3 and 4 operates in similar manner to and can be used for the same purposes as that heretofore described. In this particular embodiment, instead of the conical lower section of the vessel 1, the corresponding vessel 1a is provided with a flat bottom as shown at 20 (which may be dish shaped if desired), the bottom being insulated by a layer of ceramic material 21. The granular material is discharged from the bottom of vessel 1a through two concentric series of downcomer conduits 22 and 23 inclined downwardly and inwardly so that their representative outlets 24 and 25 terminate in a common circle. The conduits 22 and 23 discharge into a frusto-conical hopper 26 communicating with outlet pipe 4a corresponding to outlet 4 of the previous embodiment. While in the embodiment of Figures 1 and 2 the respective solids-passing channels or passageways are inclined in opposing directions and those in the embodiment of Figures 3 and 4 are inclined in the same general direction but at different angles, it will be understood that the particular slope of the channels or conduits for the withdrawal of the solids will be governed by the configuration of the area into which the same discharge and the relative size of the region thereabove and the pattern of drainage required therefor; the change in angle has at least no significant effect on velocity of flow provided the conduits individually are of adequate size and do not limit the rate of withdrawal established by the capacity of the ultimate outlet pipes 4 and 4a or other means controlling rate of flow through such pipes or outlets. In any case the pattern is arranged to effect substantially uniform withdrawal of the solid material from the cylindrical portion of the reaction vessel.

In the embodiment illustrated in Figures 5 to 7 the adaptation of the invention is illustrated as applied to withdrawing of granular catalyst or other granular contact mass from a typical reactor or kiln such as is employed in moving bed processes for hydrocarbon conversion. The vessel 30, which may be a reactor or kiln, is provided with a partition plate or tube sheet 39, which if desired may be dish shaped. Three concentric series of conduits or downcomers 31, 32, and 33 pass vertically through the tube sheet and communicate respectively with outlets 34, 35 and 36 arranged in a common circular pattern. In the particular arrangement shown, the outermost downcomers 31 are provided with a branch portion 31' inclined downwardly and inwardly, the innermost downcomers 33 are provided with a branch portion 33' inclined downwardly and outwardly while the intermediate downcomers 32 pass directly vertically downward. As shown, each of the branch portions 31' and 33' terminate respectively in short vertically extending portions 34' and 36' provided with outlets 34 and 36. All of the downcomers 31, 32, 33, discharge into the conical section 37 which communicates with the outlet pipe 38 through which the catalyst or other contact mass is transported to any required location. The number of concentric series of downcomers and their relative size and spacing will depend upon the diameter of the vessel.

In the modification of Figures 8, 9, and 10, an embodiment is shown wherein the principles of the invention are applied to a vessel which is non-circular in cross-section; one such form of vessel being the familiar rectangular regenerating kiln employed in many TCC systems. In this embodiment the upper portion 40 of the vessel is provided with straight walls 41 and the lower portion 42 is formed by converging inclined walls 43 forming therewith an inverted rectangular pyramid. A conical inner hopper 44 is inserted into the lower section 42 of the vessel up to a required height as hereinafter explained. Dummy blocks 45 are inserted at the corners of intersection of the walls 43 filling the space formed between the wall of cone 44 and the walls 43. Between the upper straight section 40 and the lower converging section 42 of the vessel a partition plate or tube sheet 46 is provided. Passing through the tube sheet 46 are three series of downcomers, each series being respectively arranged in a rectangular pattern at their inlet ends conforming with the periphery of the upper section 40 of the vessel and at their outlet ends in a common plane concentric with the axis of the vessel. Thus it will be seen that the inlets to the outermost downcomers 47 are arranged on a rectangular pattern as are those to the innermost downcomers 48 and to the intermediate downcomers 49, forming concentric square patterns. These downcomers are arranged in a direction such that their outlets respectively form a single circular pattern as indicated at 50, within the boundary of the conical hopper 44. The upper boundary of hopper 44 extends above the point of discharge of the outlets of downcomers 47, 48 and 49.

In the particular modification shown in Figures 8, 9 and 10, as is the case of that shown in Figures 5 and 6, the outermost downcomers have a branch inclining downwardly and inwardly. The innermost downcomers slope downwardly and outwardly, while the intermediate downcomers 49 pass substantially verticaly through the tube sheet, so that the discharge outlets of all of the downcomers form the single circular pattern described at a substantially common discharge level. The lower ends of downcomers 47 and 48 may be provided with short vertical portions similar to 34' and 36' of Figure 5.

Some of the features emphasized hereinabove are claimed in said Reissue Patent 23,942. Particular attention is directed to those embodiments illustrated in Figures 11 to 14 which are characterized by partitioning means forming individual open-bottomed chambers into which the solids are discharged from the downcomers. By this arrangement the precise aligning and positioning of the lower ends of the downcomers to assure uniform discharge, are avoided. Thus, as shown in Figure 11 the downcomers 60 of the outer series and the downcomers 61 of the inner series discharge respectively into chambers 62 and 63 formed by the radial plates 64 extending outwardly from the ring 65 to the sloping wall of the vessel. The ring 65 is positioned at an intermediate level in bottom 37 of the vessel and concentric with the axis of outlet 38. In the embodiment shown in Figures 13 and 14 the chambers 71 and 72, receiving solids from the respective downcomers 73 and 74, are spaced inwardly from the sloping wall of portion 37 of the vessel, and are formed by radial plates 75 extending between rings 76 and 77, both of which are concentric with the axis of outlet 38. The outer ring 77 is supported by brackets 78 extending to the sloping wall of portion 37 of the vessel.

As is more clearly illustrated in Figures 3 and 5 but common to all of the described embodiments, there is established above each inlet to the respective withdrawal conduits a tapering conical path in which granular solids move freely toward and into the conduits. Between these cones of freely moving solids more or less stagnant zones occur. Above the level L where the moving cones intersect, there is essentially uniform flow of solids over the entire cross-sectional area of the vessel. By using smaller conduits in required number for the same total capacity the level of uniform flow is located closer to the bottom of the vessel.

It is a common feature in all of the described embodiments that the inlets to the withdrawal conduits are arranged in symmetrical patterns determined by the cross-sectional configuration of the vessel at the solids withdrawal level and are so distributed that each conduit receives solids from a substantially equal cross-sectional area. The outlets of the withdrawal conduits are substantially uniformly spaced in a single circle concentric with the center of the outlet. Since the withdrawal conduits are each designed for a capacity greater than its proportionate share of the total solids mass flow rate, differences in the lengths of the several conduits and in the angles at which they are inclined do not cause inequalities in the rate of withdrawal, provided that a substantially uniform flow of solids is maintained below the common level of discharge of the conduits. In order that the solids flow freely through the withdrawal conduits these should not be inclined at an angle of less than about 45° with the horizontal. While in most arrangements the outlet pipe will be concentric with the center of the main vessel, under the conditions above described the center of the outlet pipe need not coincide with the longitudinal center of the vessel. The rate of flow of solids through the outlet pipe establishes the flow rate of solids in the withdrawal conduits, which rate may be fixed or controlled by selection of an outlet pipe of required capacity or by providing an orifice plate, valve, or other flow control device in the discharge pipe.

While withdrawal conduits of equal size are required to serve equal solids supply areas, it is within the scope of the present invention to employ in one or more series or groups conduits of a size different from that in another series or group, provided that these withdrawal conduits are sized proportionally to the individual areas served thereby and the number of such pipes employed and their distribution is such as to maintain substantial uniformity of flow over the cross-sectional area of the vessel.

It has previously been stated that each of the catalyst downcomers (for example downcomers 31, 32 and 33 in Figures 5 and 6) should serve a substantially equal flow area. There are various ways and patterns in which the inlets to the catalyst downcomers can be spaced over the cross-section of the vessel to draw from approximately equal areas. One convenient arrangement, particularly as applied to vessels of circular cross-section, is to group the inlets in several concentric series, the inlets in each series being symmetrically spaced from one another and to the extent possible also equally spaced from the nearest inlets of the adjacent series. For example, if the inlets are to be arranged in three series of concentric circles, as shown in Figures 5 and 6, the internal radius R of the cylindrical portion of the vessel is trisected and concentric circles having respective radii of ⅓R and ⅔R are drawn from the center of the vessel intersecting these points of division on the radius R, the lateral cross-section of the vessel being thus divided into 3 areas, one (A) being the area of the circle of ⅓R radius, the second (B) being the area of the annulus between the circles of ⅓R and ⅔R radius, and the third (C) being the area of the annulus between the circle of ⅔R radius and the internal wall of the vessel. These areas A:B:C are in the mathematical ratio of 1:3:5. If the number of downcomers serving these respective concentric areas are proportionately arranged in this ratio, it will be seen that each downcomer will serve a substantially equal area. The series of downcomers serving areas A, B, and C will accordingly be arranged so that their centers lie respectively on concentric circles having radii of ⅙R, ³⁄₆R, and ⁵⁄₆R. The same method may be followed in arranging a larger number of series of concentric circles, the cross-sectional area of the vessel being divided into any number of concentric annuli having areas in the ratio of the arithmetic progression having a common difference of $$2(1=a+2(n-1))$$

and the number downcomers in the series serving the respective areas being in the same ratio.

By use of the system described, catalyst or other solids are collected from the entire cross-section of the lower region of a contact or reaction vessel and transferred through a multiplicity of pipes or channels for discharge on a common circle in a lower conical section of the vessel. The velocity of solids flowing through each of such conduits is established by the flow of solids through the bottom of the conical section and out of the vessel through the discharge outlet of significantly less diameter than the vessel. With the symmetrical design of this type of draw-off system, wherein each withdrawal channel or conduit serves a substantially equal solids discharge area, flow of solids through each of the conduits is substantially uniform and thus solids are moved through and out of the vessel in uniform gravitating flow. The introduction of purge gas or other gases for like or other purposes is readily accomplished with these embodiments. Another advantage of systems such as these wherein solids flowing from a relatively large vessel to a draw-off line of substantially reduced diameter resides in the markedly reduced volume of solids and the residence time thereof in the draw-off section; thus effecting a substantial saving in the inventory of such solids in the system.

Obviously many modifications and variations of the invention as hereinbefore set forth may be made without departing from the spirit and scope thereof and therefore only such limitations should be imposed as are indicated in the appended claim.

I claim:

Apparatus characterized by substantially uniform flow of solid granular material throughout a zone of large cross-sectional area and into a small discharge conduit therebeneath, the granular material being metered through tubular conduit outlets circumferentially arranged about a single common circle above said discharge conduit, and said uniform flow being transmitted from said circumferentially arranged outlets through tubular conduits to said large cross-sectional area, said apparatus being adapted for contacting freely flowable solid materials with gaseous fluids and comprising an upright treating chamber having a vertical wall laterally enclosing said chamber, a top closure for said chamber open to the introduction of solid materials therethrough and into said chamber for gravitation of said solid materials through said chamber, a bottom member in said chamber, the upper surface of which forms a temporary support for a bed of solid materials in said chamber, said bottom member having a plurality of downwardly directed tubular conduits associated therewith through which solid materials can be withdrawn from above the surface of said bottom member, said conduits being positioned so that their inlet openings are at the upper surface of said bottom member and are arranged in a plurality of patterns, some of said conduits being directed downwardly and inwardly and other of said conduits being directed downwardly and outwardly so that the outlet openings of said conduits are arranged to form a single common circle in a horizontal plane below said bottom member, whereby withdrawal of solid material from above the surface of said bottom member is effected with substantial uniformity over the entire lateral cross section of said chamber, a confining member in solids-receiving relationship to the single circle circumferentially arranged outlets through which the solid materials flow to the discharge conduit beneath and coaxial with said common circle, each of said tubular conduits being of uniform cross section throughout, some of said tubular conduits being disposed relative to a geometric cylinder extending coaxially upwardly from said common circle at angles significantly different from the angles of other conduits, baffle means within said collecting means arranged to form barriers which laterally confine the solids discharging from said conduits into separate expanded relatively-shallow compact moving masses, said baffle means directing the flow of said separate masses downwardly into the peripheral region of said collecting means.

References Cited in the file of this patent

UNITED STATES PATENTS

| | | |
|---|---|---|
| Re. 23,942 | Shabaker | Feb. 8, 1955 |
| 2,393,893 | Evans | Jan. 29, 1946 |
| 2,412,135 | Evans | Dec. 3, 1946 |
| 2,412,136 | Evans et al. | Dec. 3, 1946 |
| 2,560,604 | Shabaker | July 17, 1951 |
| 2,596,610 | Shabaker | May 13, 1952 |